United States Patent [19]

Martin

[11] 4,149,958

[45] Apr. 17, 1979

[54] PLURAL STAGE DESALTER/DEHYDRATOR IN A SINGLE VESSEL

[75] Inventor: Robert B. Martin, Spring, Tex.

[73] Assignee: Petrolite Corporation, St. Louis, Mo.

[21] Appl. No.: 784,392

[22] Filed: Apr. 4, 1977

[51] Int. Cl.² ............... B01D 17/06; C10G 33/02
[52] U.S. Cl. .............................................. 204/302
[58] Field of Search ............................. 204/302–308

[56] References Cited

U.S. PATENT DOCUMENTS

| | | | |
|---|---|---|---|
| 1,838,922 | 12/1931 | Fisher | 204/305 |
| 2,041,954 | 5/1936 | Prutzman | 204/302 |
| 2,855,360 | 10/1958 | Waterman | 204/304 |
| 2,894,895 | 7/1959 | Turner | 204/302 |
| 2,963,414 | 12/1960 | Waterman | 204/302 |
| 3,577,336 | 5/1971 | Shirley | 204/302 |

Primary Examiner—T. M. Tufariello
Attorney, Agent, or Firm—Sidney B. Ring; Hyman F. Glass

[57] ABSTRACT

A desalter/dehydrator having a plurality of electrified coalescing stages in a single vessel, wherein the stages are isolated hydraulically to allow parallel or serial stage operations. In one embodiment, several electrical stages, each separately energized, are operated in parallel to proportionately increase vessel throughput capacity. In another embodiment, series operation is employed, wherein each successive stage receives the product from the preceding stage as feed, with fresh water being added. Placement of electrodes, distributors, collectors, etc. are determined by the type of operation to be performed in the vessel.

16 Claims, 6 Drawing Figures

PLURAL STAGE DESALTER/DEHYDRATOR IN A SINGLE VESSEL

FIELD OF THE INVENTION

This invention relates to apparatus and process useful for desalting and/or dehydrating oil-continuous emulsions such as crude petroleum oils, although they can be used in the resolution of other emulsions, which term is herein used as including dispersions. More particularly, the invention relates to such apparatus and process employing multiple electrode/distributor systems located in a single vessel.

BACKGROUND OF THE INVENTION

It is conventional to desalt or dehydrate oil-continuous emulsions by introducing such emulsions directly into an electric treating field of sufficient intensity of coalesce the suspended droplets of the dispersed phase into masses of sufficient size to gravitate from the oil. The dispersed phase of such emulsions is composed of a material, usually aqueous, that is sufficiently immiscible with the oil to produce an internal or dispersed phase. Initially, the dispersed droplets are of such small size or are so stabilized that they will not readily gravitate from the oil phase. However, the electric field coalesces such dispersed droplets, and it is found that the resulting coalesced masses gravitate rapidly from the oil, usually in the same container as that in which electric treatment takes place. In a desalting operation, a quantity of water may be mixed with the incoming crude oil in a valve or other mixer, all as well known, so that a more complete removal of salt from the oil may be accomplished. Typical of such prior art dehydrator/desalters is that described in U.S. Pat. No. 2,880,158 to Delber W. Turner and a version for use on shipboard described in U.S. Pat. No. 3,736,245 to Frederick D. Watson and Howell R. Jarvis. Other related prior art U.S. Pat. Nos. are the following: 2,033,446; 2,072,888; 2,443,646; 2,527,690; 2,543,996; 2,557,847; 2,848,412; 2,892,768; 2,894,895; 3,250,695; 3,531,393; 3,577,336; 3,592,756.
and German Patent No. 1,014,076 (Helmut Stock; Aug. 22, 1957).

It is an object of this invention to provide a dehydrating/desalting apparatus, especially useful for desalting crude oil, that employs multiple electrode/distributor systems located in a single vessel to achieve serial stage desalting and/or vastly increased oil handling capacity in a parallel stage operation.

It is a further object of this invention to provide a process for desalting crude oil in a plurality of serial stages.

Further objects of the invention will be evident to those skilled in the art in the course of the following description.

SUMMARY OF THE INVENTION

In accordance with this invention, there is provided an electric treater for resolving oil-continuous emulsions and other emulsions and for desalting of liquids such as crude oil, such treater comprising a closed vessel provided with a plurality of coalescing stages with no impermeable barriers between them. The stages are isolated hydraulically, i.e., are hydraulically substantially independent, to allow parallel or serial stage operation, each stage being provided with permeable, planar electrode means which provide an electric field to cause coalescing of the dispersed phase, ordinarily water or brine, the electric fields being superimposed.

The system is composed of multiple electrode assemblies, each with individual distributor systems with the hydraulics controlled to isolate the individual stages to allow multiple stage operation. The system can also be used to process oils by utilizing the separate electrode/distributor assemblies for parallel flow of material through the system. The use of two or three stages is preferred, although a greater number may be employed.

When employed for serial stage desalting, collector pumps are arranged between successive coalescing stages and conduits provided so that the treated liquid from one stage is returned as the feed for the succeeding stage. The electrodes are preferably horizontally disposed planar electrodes in vertically spaced relationship. The treatment vessel may be in the form of a sphere, a horizontally elongated cylinder substantially longer in length than in width, or of other suitable form.

DETAILED DESCRIPTION OF THE INVENTION

The invention is illustrated by but not limited to the following exemplary embodiments.

Referring to the drawings.

Figure 1:
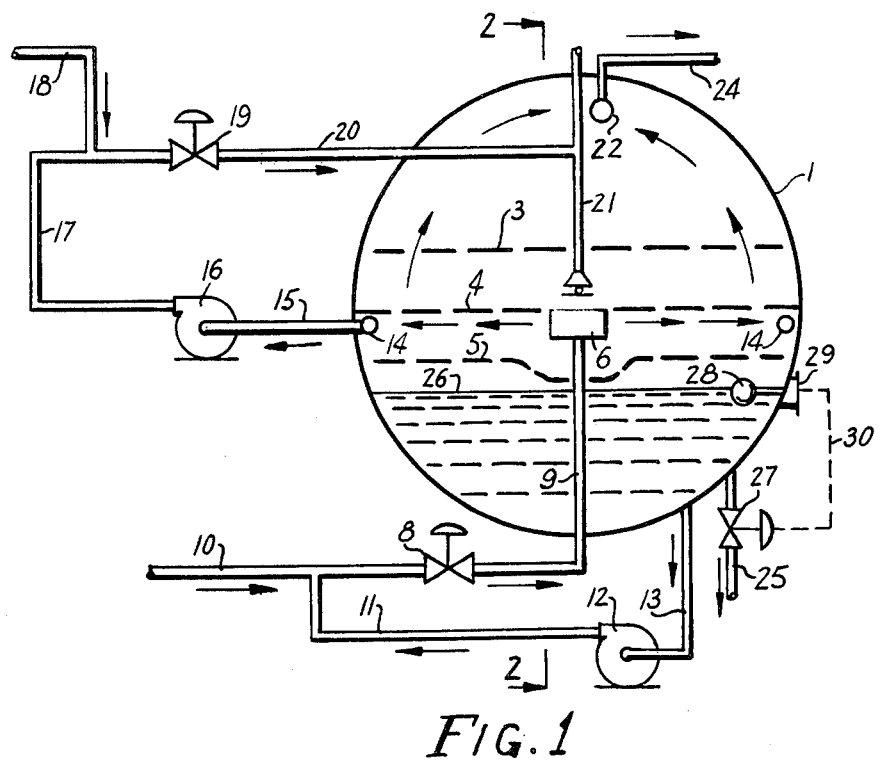
FIG. 1 is a transverse vertical cross section of one embodiment of an electrical treater of the present invention intended for serial stage operation.
Figure 2:
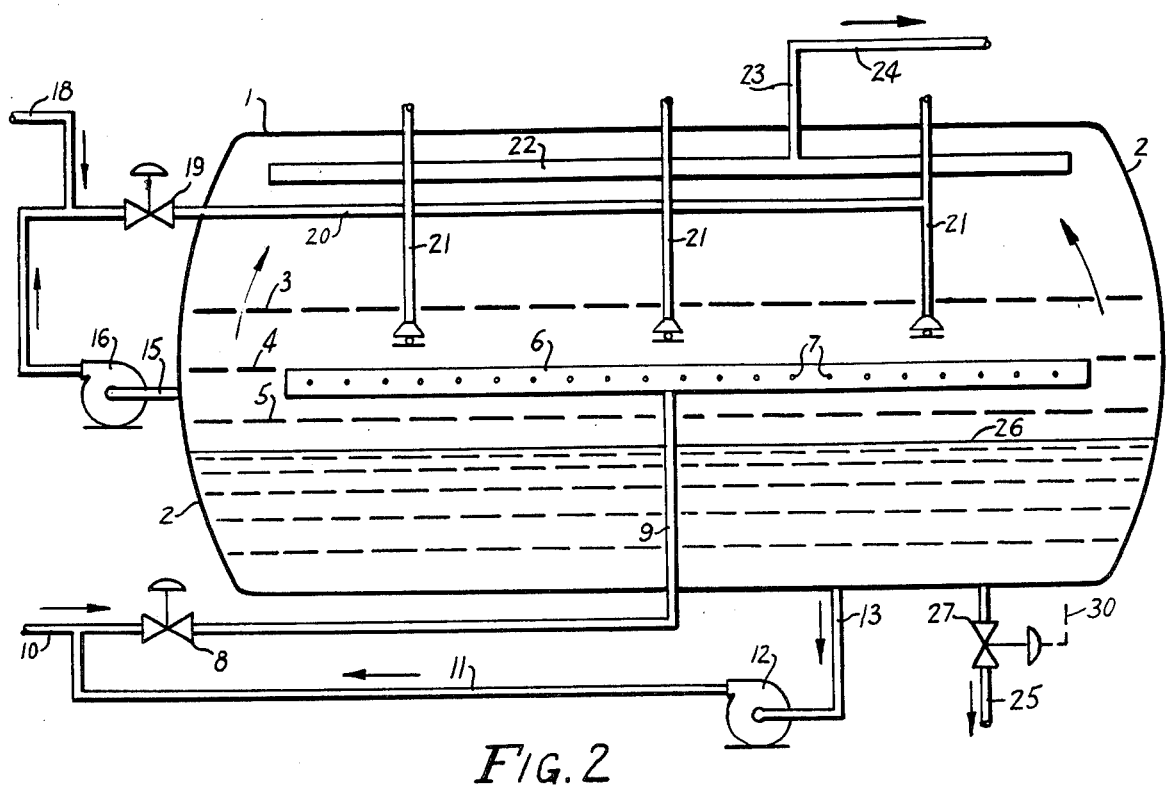
FIG. 2 is a longitudinal vertical cross section taken along line 2—2 of the electrical treater shown in FIG. 1.

FIGS. 1 and 2 illustrate one embodiment of the invention, especially useful when it is desired to convert an existing Petreco high velocity desalter to two stage series operation. The desalter consists of a horizontally disposed generally cylindrical vessel 1 having rounded ends 2, which may suitably have a diameter of about 8 to 12 feet. Lengths of about 25 feet and 49 feet have proved suitable with a 12 foot diameter vessel. Inside the vessel 1 are three horizontally disposed planar electrodes 3, 4 and 5. Upper electrode 3 and bottom electrode 5 extend almost the entire length and width of the vessel 1, electrode 5 being downwardly curved in the vicinity of its longitudinal axis to accommodate distributor 6. These electrodes are energized. Middle electrode 4, which is at ground potential, is in contact with the wall of vessel 1. The electrodes 3, 4 and 5 are spaced about 6 to 15 inches apart, 10 inches being very suitable. Each electrode may be permeable, e.g. be a grid of metal rods or pipes, suitably of cold finished steel, of a structure similar to that shown in U.S. Pat. No. 2,880,158.

A distributor 6, serving as the first stage distributor, and shown here as a box-like conduit or header, extends horizontally for most of the length of vessel 1 just under middle electrode 4, to which it may be attached, and along its longitudinal axis. Bottom electrode 5 may be downwardly curved as shown in the vicinity of its longitudinal axis to accommodate distributor 6. Orifices 7 are provided in the sides of the conduit all along its length. However, instead of a box-like conduit, a pipe with holes drilled in it may be substituted. Distributor 6 is supplied by mixing valve 8 via conduit or riser pipe 9. Mixing valve 8 is supplied by oil conduit 10 and water conduit 11, which may be connected with pump 12 and recycle conduit 13, as shown, and/or a fresh water source not shown. Interstage outlet collectors 14, which may be drilled pipes supported at the vessel wall with angle clips (not shown) extend longitudinally along the sides of tank 1, and are connected to conduit 15 which leads to oil recycle pump 16 and thence to conduit 17. Conduit 18, connected to a fresh water source, leads into conduit 17, which leads to mixing valve 19. A conduit 20 extends from mixing valve 19 to distributor modules 21, which may be similar in structure to that shown in Turner U.S. Pat. No. 2,543,996 or Turner U.S. Pat. No. 2,527,690. Although three such modules are shown here, a lesser or greater number may be employed. For example, in a 49 foot long vessel, four such modules may be used. An outlet collector 22, which may be a pipe with holes drilled in the upper wall, extends horizontally along the top of tank 1 and leads to outlet 23 and conduit 24. A water effluent conduit 25 is connected to the lower part of vessel 1.

In operation, the temperature of the crude oil depends upon the crude specific gravity and the type of crude. However, in many cases of crude oil, temperatures of between about 100° F. and 350° F., with about 250° F. being optimum, are used. The crude oil is charged by conduit 10 and water is added via conduit 11, which is supplied by recycle conduit 13. The oil may be brought to the desired temperature by any suitable procedure, such as by heat exhange with another refinery stream. The amount of water added is suitable about 10% of the crude oil charged. The two fluids are mixed in mixing valve 8 to form an emulsion. The emulsion is carried through riser pipe 9 to the first stage distributor 6, from whence it flows between middle electrode 4 and bottom electrode 5 in either direction in a generally horizontal transverse direction toward the sides of the vessel 1 where the interstage collectors 14 are located. Water which has been thrown out of emulsion by the electric field between electrodes 4 and 5 falls toward the bottom of vessel 1, where a pool of collected water is maintained. The main portion of the treated oil is taken up by collectors 14 and is pumped by interstage pump 16 to conduit 17. A 5% addition of fresh water takes place in this conduit and is emulsified into the oil by mixing valve 19. The second stage emulsion thus formed is carried by conduit 20 to second stage distributors 21 from whence it flows between electrodes 3 and 4 in either direction, more or less transversely, to the sides of the vessel 1. The treated oil passes upwardly near the edge of electrode 3 and along the sides of the vessel 1 and leaves the vessel by means of outlet collector 22, outlet 23 and conduit 24. The arrows shown in the figures indicate the path of the fluids through the conduits and, in a general way, inside the vessel 1.

The level of the interface 26 of the water with the treated oil may be maintained automatically at the desired position in the lower portion of vessel 1. As shown in the drawings, this is accomplished by means of motor valve 27 on effluent conduit 25, which valve is actuated between open and closed positions by a float 28 connected to a control unit 29, which delivers an actuating signal through an interconnection, indicated by dashed line 30, to valve 27. The float 28 senses the water level interface 26, and the valve 27 is controlled to maintain the interface 26 at the desired level in the lower portion of vessel 1. Other liquid level control means for maintaining the interface 26 at the desired level, such as an electrical capacitance probe, may be employed.

While the above described embodiment is of special interest in the conversion of existing desalting units having distributors 21 already present, desalters are also contemplated and within the scope of this invention wherein both the first and second stage distributors may take the form of the boxlike conduit 6 or drilled pipe. Similarly, both first and second stage distributors may take the form of distributors 21. Moreover, either or both stage distributors may be supported by and supplied either from the top or bottom of vessel 1, or otherwise.

In the embodiment described above, the top and bottom electrodes 3 and 5 are each energized with its own transformers, here not shown, and the middle electrode 4 is at ground potential. However, it is also contemplated and within the scope of this invention that the top and middle electrode be charged individually and the bottom electrode grounded. A potential difference of about 15,000 to 33,000 volts may suitably be maintained between electrodes 3 and 4 and between electrodes 4 and 5. The energized electrodes may be opposed electrodes if single phase current is employed or two legs of a three phase current (3 phase open Δ) where the grounded electrode is the middle one. Moreover, if a three phase system is used, all three electrodes may be energized. The supports and circuitry for the electrodes are omitted in FIGS. 1 and 2 but may be the same as that shown in FIG. 3, described below.

Figure 3:
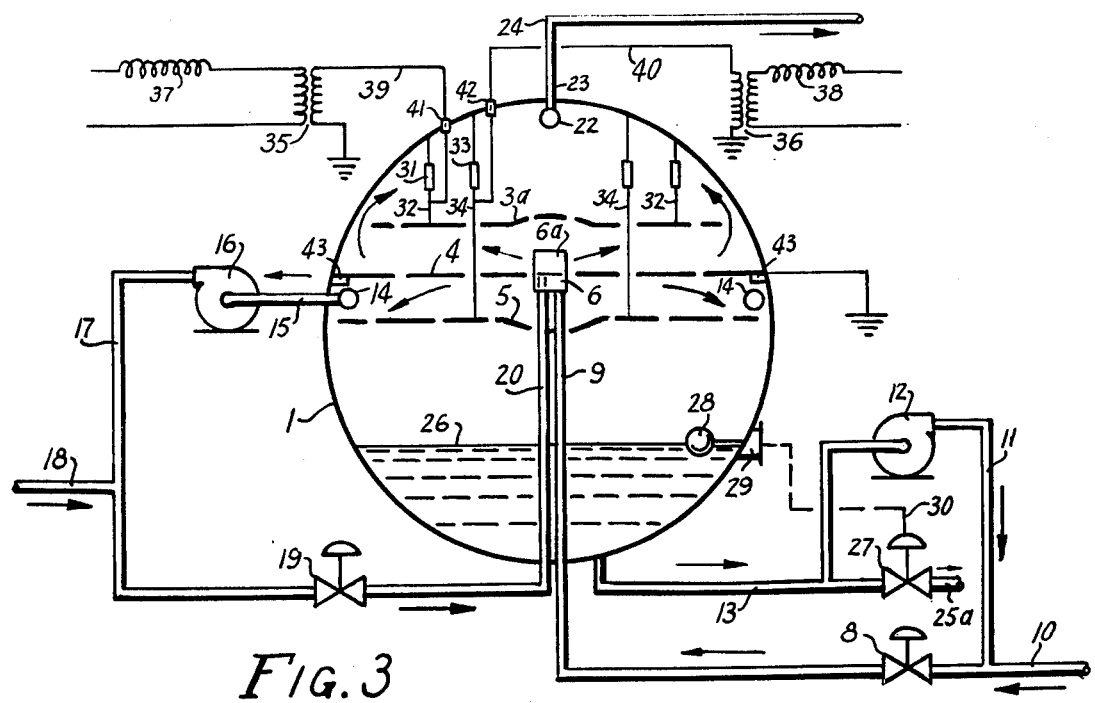
FIG. 3 is a transverse vertical cross section of another electrical treater of this invention intended for serial stage operation.

FIG. 3 is a representation of a vertical cross-section of an embodiment of the invention using a horizontal cylindrical vessel 1 with boxlike conduits 6 and 6a as distributors in both stages and otherwise similar to its main features and operation to that shown in FIGS. 1 and 2. The reference numerals in this figure correspond to those employed in FIGS. 1 and 2 for the same or similar features.

In this embodiment distributors 6 and 6a are both fed from below by riser pipes 9 and 20, respectively. The water leaves vessel 1 by means of a single conduit 13 which supplies recycle water to conduit 11 and effluent to conduit 25a. Motor valve 27 on conduit 25a is actuated by a signal from control unit 29. Upper electrode 3a in this embodiment is upwardly curved in the vicinity of its longitudinal axis to accommodate distributor 6a, being symmetrical in this respect to bottom electrode 5.

Electrode 3a is suspended by one or more vertical insulators 31 and rods 32, as required to support the weight of the electrode. Similarly electrode 5 is suspended by one or more vertical insulators 33 and rods 34. Electrodes 3 and 5 are energized by transformers 35 and 36, respectively. The middle electrode 4 is at ground potential. It is suitably fastened to the vessel 1, for example, by means of attached rail bars 43, vessel 1 being grounded. As shown here, transformers 35 and 36 are step up transformers having reactors 37 and 38 in series with the respective primaries. The secondaries have one end grounded and energize conductors 39 and 40, respectively, which connect through entrance bushings 41 and 42, respectively, to electrodes 3a and 5.

Figure 4:
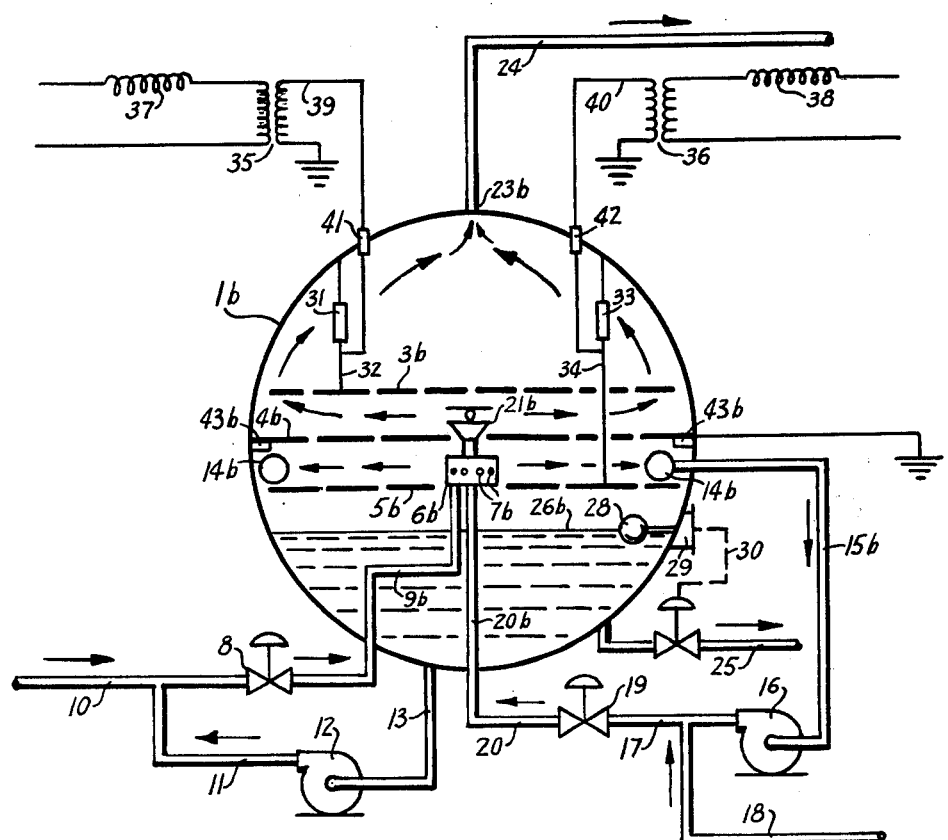
FIG. 4 is a vertical cross section of yet another electrical treater of this invention intended for serial stage operation.

FIG. 4 is a representation of a vertical cross section of a spherical desalter such as the Petreco spherical desalter which has been converted to two stage series operation. The reference numerals in this figure also correspond to those employed in FIGS. 1 and 2 for the same or similar features. Vessel 1b is a spherical container which may suitably have a diameter of 18 feet. In this embodiment, both first and second stage distributors 6b and 21b are brought in and supplied from the bottom of the vessel. The first stage distributor 6b is, as shown here, a circular box supplied by conduit 9b and built around riser pipe 20b and having orifices 7b around its periphery to control flow distribution. Electrodes 3b, 4b and 5b are circular, as required to fit the cross section of the spherical vessel 1b, electrode 4b being suitably fastened to the vessel 1b, for example, by means of attached rail bars 43b, vessel 1b being rounded. Collectors 14b, which may be drilled pipes arcuately shaped to conform to the sides of vessel 1b, and supported at the vessel wall with angle clips (not shown), are positioned to take up the main portion of the oil treated in the first stage. The treated oil is carried by conduit 15b to recycle pump 16. The operation of this desalter is otherwise similar to the embodiments described above.

In each of the above described embodiments, the exit velocity from the drilled pipe distributor or the orifices of the distributor 6 or 6b is such that there is enough inertial energy to carry the emulsion in a horizontal plane between the treating electrodes 4 and 5 or 4b and 5b to the interstage collectors 14 or 14b. These collectors are located to collect the first stage treated oil and some "override" of fluid from the second stage of treatment. The interstage pumping rate is controlled so that it exceeds the rate at which the treated oil is withdrawn from the unit by the second stage outlet collector. This may be accomplished by operating the recycle pump 16 at a pumping rate 10 to 20% faster than the initial charging rate.

Figure 5:
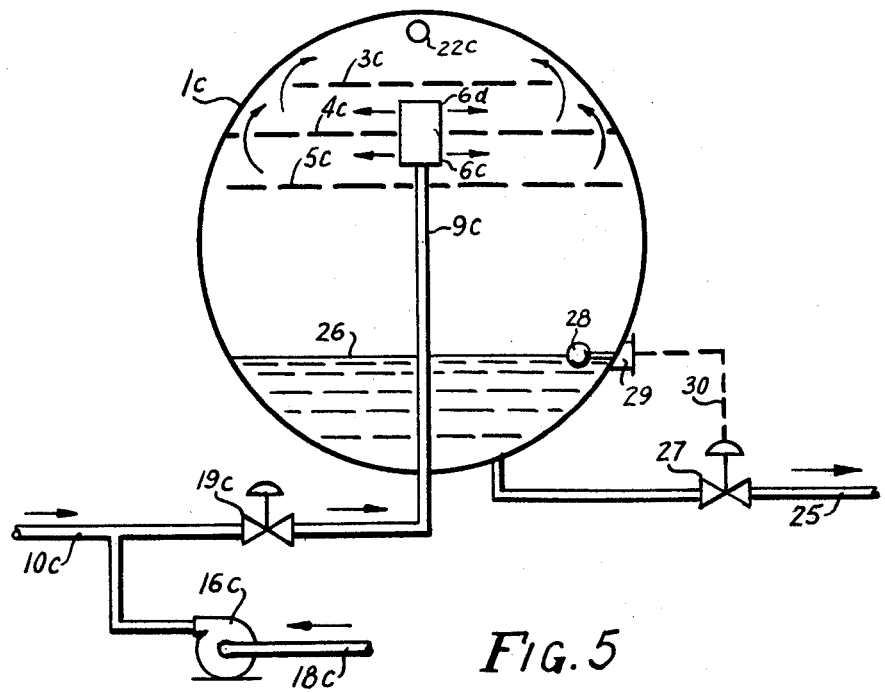
FIG. 5 is a vertical cross section of an electrical treater of this invention intended for parallel stage operation.

FIG. 5 is a representation of a vertical cross section of a desalter having two parallel stages. Such a system has the potential of doubling the oil handling capacity of a typical single electrode, single distributor system. The reference numerals in this figure correspond to those employed in FIGS. 1 and 2 for the same or similar features. In this embodiment, riser pipe 9c supplies both distributors 6c and 6d, shown here as the boxlike conduit type. In operation, about 5% of water by volume based on the oil feed is introduced by conduit 18c and pump 16c and is mixed in mixing valve 19c with crude oil introduced in conduit 10c. The mixture then passes into conduit 9c. The oil-water mixture is distributed in two parallel paths, one between electrodes 3c and 4c and the other between electrodes 4c and 5c, electrodes 3c and 5c being energized and 4c being at ground potential. The oil-water mixture travels toward the sides of vessel 1 in each instance and thence upward toward outlet collector 22c where the treated oil is withdrawn. The salt containing water is separated from the oil-water mixture by the passage between the electrodes and drops downwards into the pool of water at the bottom of the vessel 1c, the level of which, represented by interface 26, is maintained by effluent conduit 25, float 28, control unit 29, interconnection 30 and motor valve 27, as described in connection with FIGS. 1 and 2.

Three or more separate electrode-collector systems can also be used if higher oil handling capacities are desired.

Figure 6:
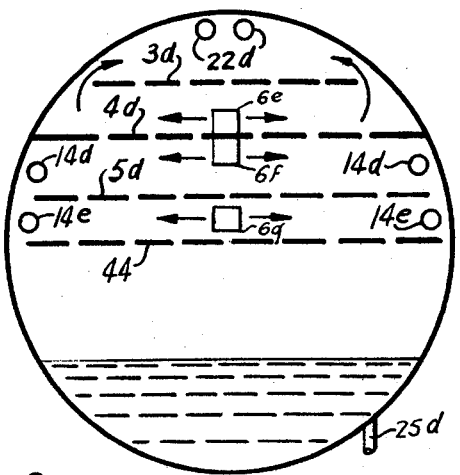
FIG. 6 is a schematic illustration of a vertical cross section of a three stage series electrical treater of this invention.

FIG. 6 is a schematic representation of a vertical cross section of a desalter employing three desalting stages in series. The reference numerals correspond to those employed in FIGS. 1 and 2 for the same or similar features. In this embodiment, a fourth planar, horizontally disposed electrode 44 is employed in addition to the three electrodes 3d, 4d and 5d, similar to those shown in the previously described embodiments. Electrode 44 is positioned below electrode 5d. Electrodes 3d, 5d and 44 are energized and electrode 4d is at ground potential, An additional distributor 6g, positioned between electrodes 5d and 44, is employed in addition to distributors 6e and 6f and a second interstage collector 14e is employed in addition to first interstage collector 14e. The distributors are all shown as boxlike conduits. In this embodiment, distributor 6g serves as the first stage distributor; distributor 6f as a second stage distributor; and distributor 6e serves as a third stage distributor. Fresh water for desalting is supplied to each desalting stage, although recycle water may be employed in the first stage. The treated product leaves the vessel 1 through outlet collectors 22d and water is removed through outlet 25d. The various conduits, valves and pumps removing and supplying fluids to and from the various stages and the electrical circuitry are not shown, but their nature will be evident from the descriptions of the embodiments shown in FIGS. 1 to 4.

In an analogous manner to that of FIG. 6, desalters with more than three stages may be constructed.

The various distributors, collectors and electrodes described above may be supported in part by conventional means well known in the art, such as guy wires, in addition to being supported by the conduits and other support means disclosed.

It will be apparent from the foregoing description that the invention is not limited to a particular shape of vessel, electrical circuitry, voltage employed, type of distributors, arrangement of conduits, etc. Many embodiments, modifications, developments, and variations of forms are contemplated as long as they fall within the broad scope of the appended claims.

I claim:

1. An apparatus for desalting oil-continuous oil-water emulsions, said apparatus comprising a closed vessel which is provided therein with a plurality of coalescing stages, said stages being hydraulically substantially independent to allow serial stage operation, there being contained within said closed vessel: a plurality of horizontally disposed planar permeable electrodes in vertically spaced relationship; first stage distributor means and conduit means for supplying oil-water emulsion to said first stage distributor means, said first stage distributor means being adapted to cause said emulsion to flow in a first stage treatment between the bottom electrode and the electrode next above said bottom electrode; means for collecting the so-treated first stage product; second stage distributor means and conduit means for supplying a second stage oil-water emulsion to said second stage distributor means, said second stage distributor means being adapted to cause said second stage emulsion to flow in a second stage treatment between the electrode next above the bottom electrode and the electrode next above said electrode next above the bottom electrode; means for collecting the so-treated second stage product; at least one additional stage distributor, electrode and collector means including product withdrawal and outlet means in the upper portion of said vessel, said permeable electrodes and the vessel interior being adapted and arranged to permit water to pass downwardly through said electrodes to the lower portion of said vessel; water withdrawal means in the lower portion of said vessel; mixing means for each stage and conduit means for supplying oil feed and water to each of said mixing means, said mixing means being adapted to supply oil-water emulsion to said conduit means for supplying oil-water emulsion to each of said distributor means; pumping means and conduit means for withdrawing products from the collecting means of each stage other than the last and passing it to the mixing means for the succeeding stage; and means for supplying water to each of said mixing means.

2. The apparatus of claim 1 wherein said vessel is horizontally elongated.

3. The apparatus of claim 2 wherein said vessel is in the form of a horizontal cylinder substantially longer in horizontal length than width.

4. The apparatus of claim 1 wherein said vessel is spherical.

5. The apparatus of claim 1 wherein there are three stages.

6. The desalting apparatus of claim 1, comprising also means for controlling the level of the water in the lower portion of said vessel at a predetermined position.

7. The apparatus of claim 1, wherein each said distributor means is centrally positioned with respect to each pair of adjacent electrodes.

8. An apparatus for desalting oil-continuous oil-water emulsions, said apparatus comprising a closed vessel which is provided therein with two coalescing stages, said stages being hydraulically substantially independent to allow serial stage operation, there being contained within said closed vessel: three horizontally disposed permeable planar electrodes in vertically spaced relationship; first stage distributor means and conduit means for supplying oil-water emulsion to said first stage distributor means, said first stage distributor means being adapted to cause said emulsion to flow in a first stage treatment between the bottom and middle electrode; means for collecting the so treated first stage product; second stage distributor means and conduit means for supplying a second stage oil-water emulsion to said second stage distributor means, said second stage distributor means being adapted to cause said second stage emulsion to flow in a second stage treatment between the top and middle electrode; product withdrawal and outlet means in the upper portion of said vessel; said permeable electrodes and the vessel interior being adapted and arranged to permit water to pass downwardly through said electrodes to the lower portion of said vessel; water withdrawal means in the lower portion of said vessel; first stage mixing means, conduit means for supplying oil feed and water to said mixing means, said first stage mixing means being adapted to supply oil-water emulsion to said conduit means for supplying oil-water emulsion to said first stage distributor means; second stage mixing means, pumping and conduit means for withdrawing said first stage product from the first stage collecting means and passing it to said second stage mixing means; conduit means for supplying water to said second stage mixing means, said second stage mixing means adapted to supply second stage oil-water emulsion to said conduit means for supplying said second stage emulsion to said second stage distributor means.

9. The desalting apparatus of claim 8, comprising also means for controlling the level of water in the lower portion of said vessel at a predetermined position.

10. The apparatus of claim 8 wherein the top and bottom electrodes are energized and the middle electrode is at ground potential.

11. The apparatus of claim 8 wherein the top and middle electrodes are energized and the bottom electrode is at ground potential.

12. The apparatus of claim 8 wherein the top, middle and bottom electrodes are all energized.

13. The apparatus of claim 8, wherein said vessel is horizontally elongated.

14. The apparatus of claim 13 wherein said vessel is in the form of a horizontal cylinder substantially longer in horizontal length than width.

15. The apparatus of claim 8, wherein said vessel is spherical.

16. The apparatus of claim 8, wherein each said distributor means is centrally positioned with respect to each pair of adjacent electrodes.

* * * * *